United States Patent [19]

MacKay et al.

[11] 4,427,136
[45] Jan. 24, 1984

[54] ROTARY VALVE

[75] Inventors: Patrick W. MacKay, Garza Garcia; Gilberto G. Garcia, Monterrey, both of Mexico

[73] Assignee: Hylsa, S.A., Monterrey, Mexico

[21] Appl. No.: 289,997

[22] Filed: Aug. 4, 1981

Related U.S. Application Data

[63] Continuation-in-part of Ser. No. 207,388, Nov. 17, 1980.

[51] Int. Cl.³ .............................................. G01F 11/24
[52] U.S. Cl. ...................................... 222/368; 414/219
[58] Field of Search ....................... 222/368; 221/266; 414/219, 220

[56] References Cited

U.S. PATENT DOCUMENTS

| | | |
|---|---|---|
| 1,331,785 | 2/1920 | Rogers et al. |
| 1,437,863 | 12/1922 | Raymond .......................... 222/368 X |
| 1,461,770 | 7/1923 | Ellis et al. ......................... 222/368 X |
| 1,542,732 | 6/1925 | Schranz . |
| 1,997,791 | 4/1935 | Hoberg et al. .................... 222/368 X |
| 2,326,005 | 8/1943 | Bradley . |
| 2,663,465 | 12/1953 | Hogin ................................... 222/368 |
| 2,861,720 | 11/1958 | Zilke ................................. 222/368 X |
| 2,907,499 | 10/1959 | Agronin ........................... 222/368 X |
| 2,962,381 | 11/1960 | Dobry et al. .................... 222/368 X |
| 3,131,821 | 5/1964 | Keijitsujihata et al. ......... 222/368 X |
| 3,970,224 | 7/1976 | Chatham et al. ................ 222/368 X |
| 4,173,298 | 11/1979 | Lease ................................... 222/368 |

FOREIGN PATENT DOCUMENTS

| | | |
|---|---|---|
| 124890 | 4/1919 | United Kingdom . |
| 135888 | 12/1919 | United Kingdom . |
| 187664 | 11/1922 | United Kingdom . |
| 1026026 | 4/1966 | United Kingdom . |
| 1241446 | 8/1971 | United Kingdom . |
| 1549563 | 8/1979 | United Kingdom . |
| 146123 | 7/1962 | U.S.S.R. . |
| 620422 | 8/1978 | U.S.S.R. . |
| 709476 | 1/1980 | U.S.S.R. . |

Primary Examiner—F. J. Bartuska
Attorney, Agent, or Firm—Curtis, Morris & Safford

[57] ABSTRACT

A rotary valve adapted to be used in regulating the flow of a particulate material comprises a casing with inlet and outlet conduits and a rotor mounted for rotation about a horizontal axis in the casing. The rotor has a ring of partially closed pockets to meter the particulate material passing through the valve and its periphery is spaced inwardly from the interior of the casing an amount sufficient to prevent squeezing and disintegration of the particulate material between the rotor and inlet conduit. A baffle prevents particulate material from flowing downwardly in the space between the rotor and casing at the up-turning of the rotor.

8 Claims, 5 Drawing Figures

ROTARY VALVE

This application is a continuation-in-part of our application Ser. No. 207,388 filed Nov. 17, 1980.

This invention relates generally to rotary valves of the type heretofore used in regulating the flow of particulate solids from one location to another. The present rotary valve has been found useful in connection with the direct gaseous reduction of iron ore pellets to sponge iron pellets with a heated reducing gas in a vertical shaft reactor wherein the valve is used at the bottom of the reactor to control the discharge of the sponge iron pellets or granules therefrom. As the description proceeds, it will become apparent to those skilled in the art that a rotary valve incorporating the present invention can also be usefully employed to regulate the flow of other types of particulate or granular materials in other types of applications.

In preparing the feed material for gaseous reduction process the ore as mined is commonly beneficiated in finely divided form as, for example, by magnetic concentration, and then pelletized. While the resulting pellets have a reasonable amount of integrity, they are somewhat friable and subject to disintegration under heavy pressures. Since the gaseous reduction process is carried out below the melting point of iron, the sponge iron granules produced are similarly friable.

In one type of rotary discharge valve heretofore used at the bottom of sponge iron reduction reactors, a rotor having radial blades or vanes is so mounted for horizontal rotation in a cylindrical casing that the radially outward tips of the rotor blades either touch the interior wall of the casing or are spaced therefrom by only a small clearance. Normally when such a valve is used at the bottom of a sponge iron reduction reactor, the sponge iron particles flow by gravity through a tubular valve inlet conduit at the top of the rotary valve to the spaces between the rotor blades and are carried by rotation of the valve to a discharge conduit at the bottom of the valve. It has been found that as the rotor blades move past the inlet conduit there is a tendency for the sponge iron particles to be squeezed between the radially outward portions of the rotor blades and the inner end of the inlet conduit. The pressure of this squeezing action is sufficient to cause a certain amount of disintegration of the sponge iron particles, thereby producing an excessive amount of undesired fine material.

It is a general object of the present invention to provide an improved rotary valve for regulating or metering the flow of a particulate material. It is another object of the invention to provide a rotary valve that minimizes the disintegration of friable solid particles being handled therein. It is a further object of the invention to reduce the tendency of the particulate material being handled to become packed in the inner portions of the spaces between the vanes of the previously used vaned rotors. It is still another object of the invention to provide a rotary valve useful in regulating the discharge of particles from a reactor that is being operated at an elevated pressure. Other objects of the invention will be in part obvious and in part pointed out hereafter.

In general, the objects and advantages of the present invention are achieved by providing a rotary valve with a rotor having one or more pellet-receiving pockets and a diameter somewhat less than that of the interior of the casing so that the rotor and casing cooperate to define an annular space therebetween. It is evident that such an annular space is potentially capable of providing a path for uncontrolled flow of particles therethrough. In accordance with the present invention such uncontrolled particle flow is minimized in a manner described below.

The numerous objects and advantages of the present invention can best be understood and appreciated by reference to the accompanying drawings which illustrate a rotary valve incorporating a preferred embodiment of the invention and wherein.

Figure 1:
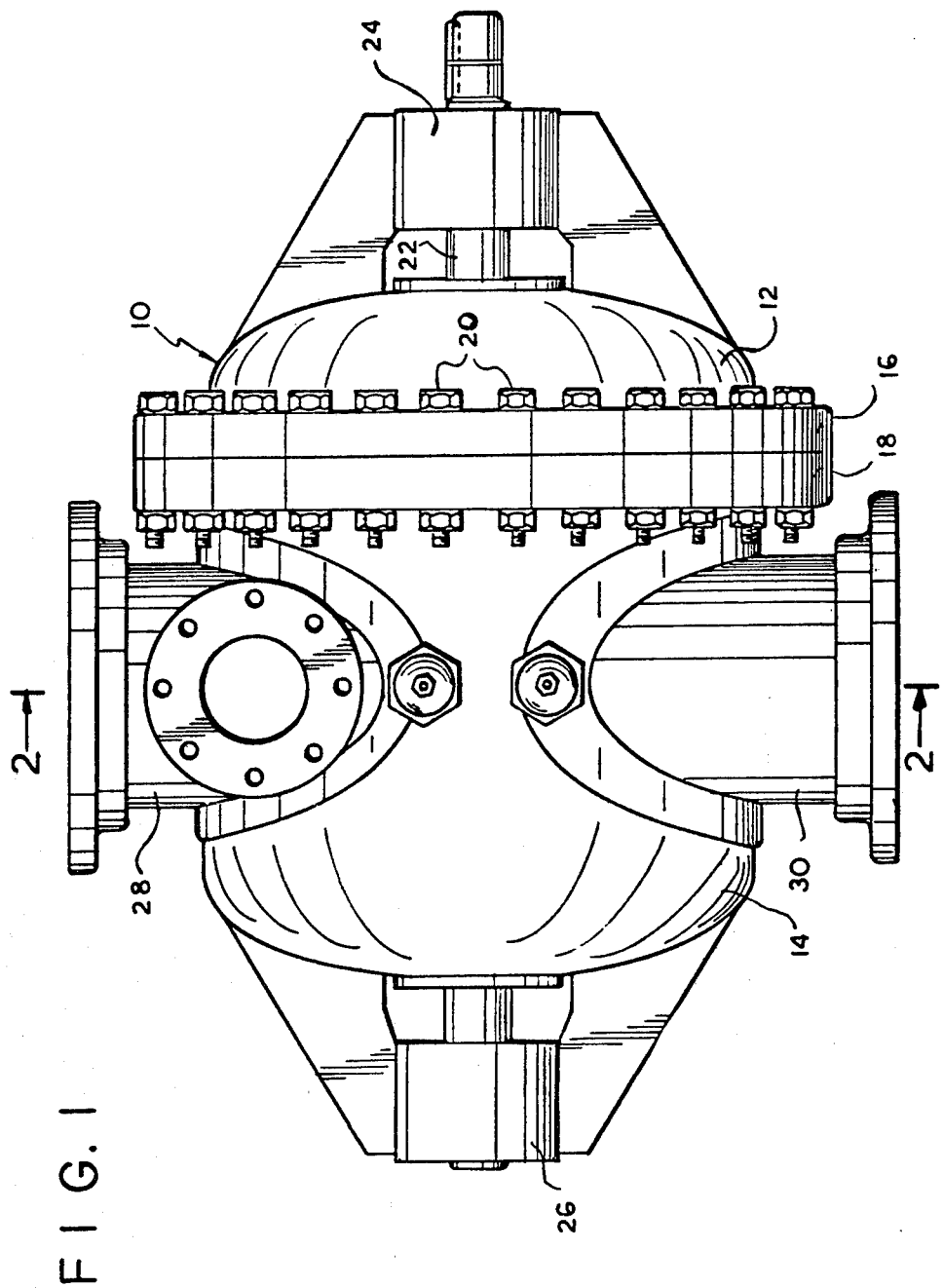
FIG. 1 is a side elevation of the valve.

Referring to the drawings and particularly to FIG. 1, the rotary valve there shown has a casing 10 comprising the sections 12 and 14 having the abutting flanges 16 and 18, respectively, secured together by the bolts 20. The rotor (which is not shown in FIG. 1) is secured to a horizontal shaft 22 mounted for rotation in the bearings 24 and 26. At the top of the casing there is a flanged inlet 28 through which sponge iron particles enter the valve and a flanged discharge connection 30 is provided at the bottom of the valve casing.

Figure 2:
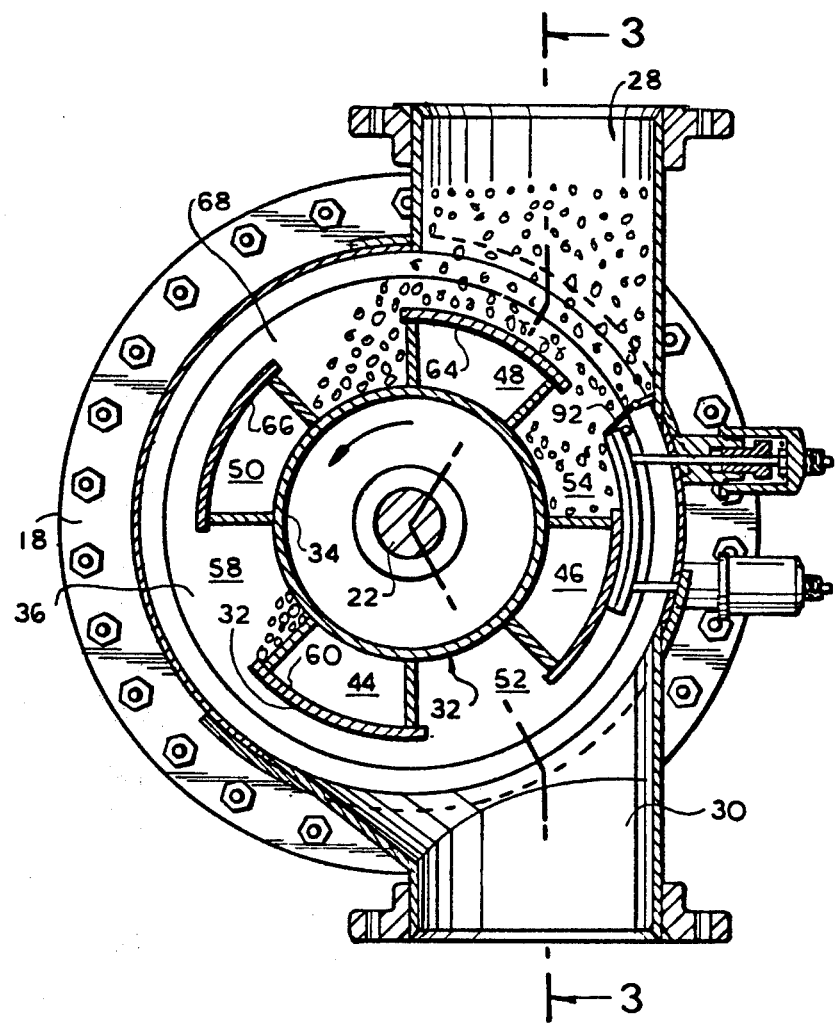
FIG. 2 is a vertical section taken on the line 2—2 of FIG. 1 and showing the pellet-receiving pockets of the rotor and the baffle means at the upturning side of the rotor.
Figure 3:
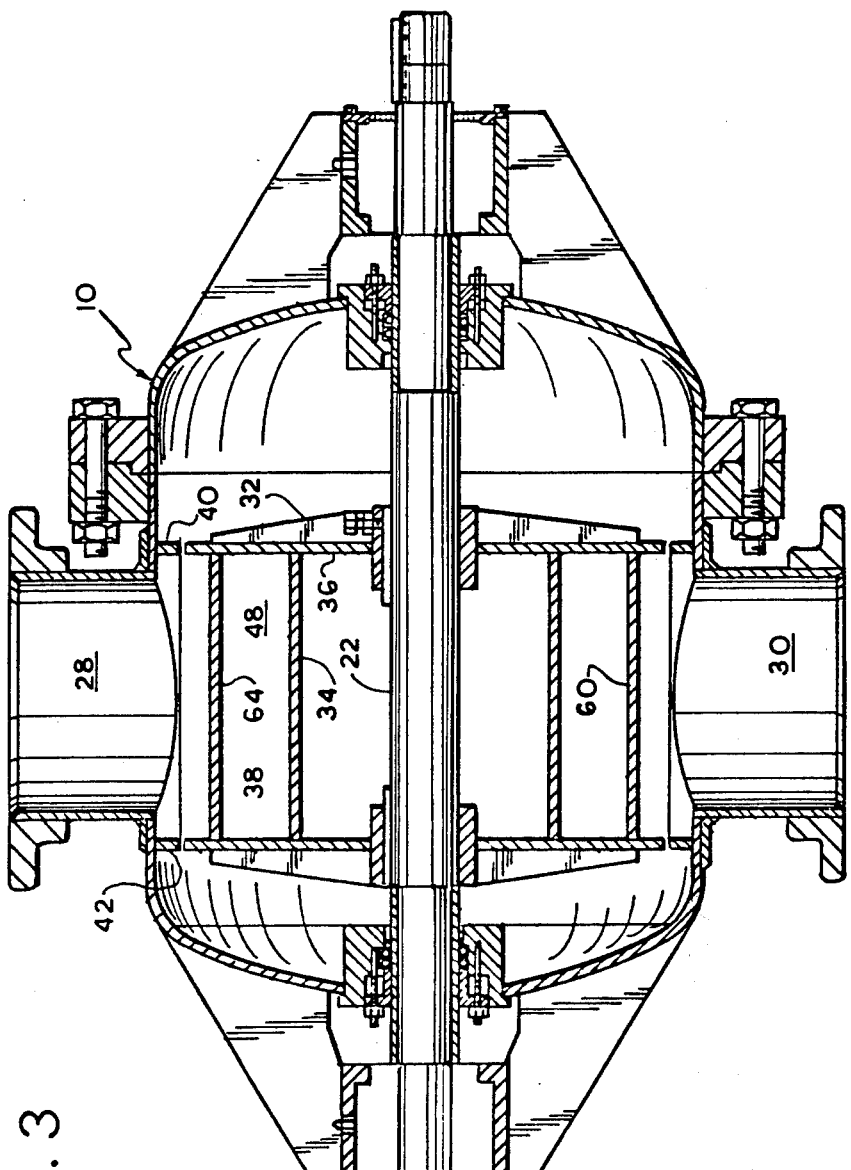
FIG. 3 is a vertical section taken on the line 3—3 of FIG. 2 and showing the mounting of the rotor within the casing.

Turning now to FIGS. 2 and 3, the rotor which is generally designated 32 comprises a drum 34 secured between two circular side plates 36 and 38. As particularly shown in FIG. 3, the side plates 36 and 38 of the rotor are aligned with annular rings 40 and 42, respectively, secured to the interior of casing 10 with only a small clearance between the outer peripheries of the side plates and the inner peripheries of the rings 40 and 42, respectively.

Referring now to FIG. 2, on the exterior of drum 34 there are formed a series of alternately closed and open pockets. More particularly, the closed pockets 44, 46, 48 and 50 are symetrically arranged around the drum 34 and define intervening spaces forming the open pockets 52, 54, 56 and 58. The pockets 44, 46, 48 and 50 have the arcuate outer walls 60, 62, 64 and 66, respectively, that are concentric with the shaft 22 and the drum 34. As shown in FIGS. 2 and 3 the outer walls of the closed pockets are spaced inwardly a substantial amount from the casing wall to define an annular space 68 between the rotor and casing.

The width of the annular space 68 should be selected so as to prevent crushing of the sponge iron particles between the rotor and the wall of the inlet connection 28. One criterion for selecting the width of the annular spacing 68 is based upon the mean diameter of the particles being processed. More particularly, the width of the annular spacing 68 should be larger than twice the diameter of the mean size of the particles to insure that few, if any, sponge iron particles are crushed between the rotor and the wall of the inlet connection 28. An alternative criterion for selecting the width of the annular space 68 is based upon the selection of the ratio of the diameter of the rotor to that of the casing depending upon the desired capacity of the valve so as to minimize crushing of the sponge iron particles.

As shown in FIG. 2, the inlet connection 28 and outlet connection 30 are vertically aligned with one another, but for reasons that will be described hereafter, they are laterally offset with respect to the center of shaft 22.

Figure 4:
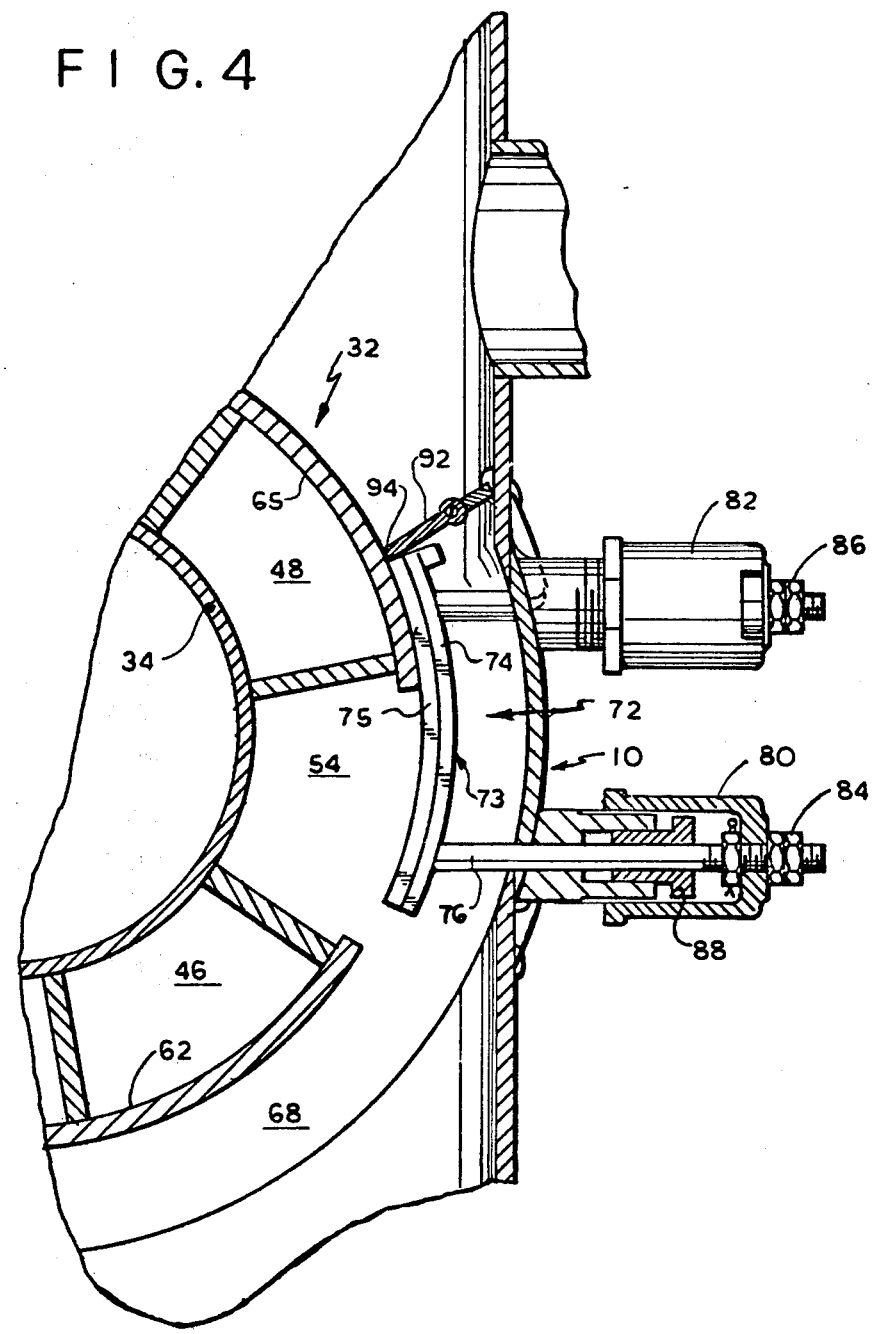
FIG. 4 is an enlarged section of the righthand portion of the rotor as shown in FIG. 2.

As viewed in FIG. 2, the rotor turns counterclockwise and a baffle means is provided at the upturning side of the rotor to prevent sponge iron particles from falling through the annular space 68 at this side of the rotor (best shown in FIG. 4). Referring to FIG. 4, the baffle structure generally designated 72 comprises an arcuate shoe 73 made up of bracket or support 74 and wearplate 75. The bracket 74 is secured to four rods, only two of which 76 and 78 are shown in FIG. 4. The rods supporting arcuate bracket 74 extend through the casing 10 into housings 80 and 82 secured to the exterior of the casing. The rods 76 and 78 are slidably adjustable through the casing by means of the nuts 84 and 86 to adjust the position of the bracket 74 in relation to the rotor 32. The housings 80 and 82 are provided with packing glands 88 to prevent leakage of gas through the casing when the rotary valve and the reactor it serves are operated under elevated pressure. As indicated above, the bracket 74 has replaceably secured thereto an arcuate wearplate 75, which is positioned to bear against the external surfaces of the closed pockets of the rotor. At the upper end of bracket 74 there is a baffle plate 92 pivotally mounted in the casing and having an inner end 94 biassed to bear against the upper end of the bracket. The construction is such that sponge iron pellets entering the valve through the inlet connection 28 are prevented from flowing through the annular space 68 at the upturning side of the rotor.

The manner in which the valve operates can best be described with reference to FIG. 2. The sponge iron pellets entering the conduit 28 flow downwardly into the open pockets 54 and 56 but are prevented by the pivoted baffle plate 92 from flowing down through the annular space 68 at the upturning side of the rotor. Particles flowing from inlet 28 into pocket 56 will continue to flow into the pocket until the normal angle of repose of the particles is attained. This angle which is indicated as alpha in FIG. 2 is approximately 30° for a typical mass of sponge iron pellets. As indicated in FIG. 2, this repose angle is achieved before the pocket 56 is completely filled with pellets and hence there is no uncontrolled flow of pellets through the annular space 68 at the downturning side of the rotor.

The lateral displacement of the inlet conduit plays a significant role in achieving the foregoing result. If, for example, the center of the inlet conduit 28 were aligned with the center of shaft 22, and the dimensions of the rotor and the inlet conduit remained the same, pocket 56 would be filled to overflowing and sponge iron pellets would roll downwardly over the wall 66 of closed pocket 50. In order to use the angle of repose of the pellets to achieve a limitation of the flow of pellets into open pocket 56 with inlet conduit 28 vertically centered above the shaft, it would be necessary to increase the rotor diameter very substantially in relation to the diameter of the inlet conduit. In other words, the lateral spacing of the inlet conduit permits the use of the normal angle repose as a limitation of flow of pellets into pocket 56 with a rotor of relatively small diameter.

As the rotor rotates counter-clockwise as shown in FIG. 2, a quantity of pellets measured by the capacity of the open pocket 56 is moved downwardly and discharged through the outlet connection 30. As the rotor turns counter-clockwise and arcuate wall 64 of closed pocket 48 rotates through its zenith, it entrains a few pellets and dicharges them into the annular space 68 of the downturning side of the rotor. However, calibration test data have demonstrated that only a small proportion of the total pellets handled by the valve flows through the annulus 68 in this manner and such uncontrolled pellets have little effect on the accuracy with which the valve measures and regulates the amount of material flowing therethrough.

As pointed out above, in prior rotary valves of the type in which pockets are defined by radial blades spaced around the rotor, some difficulty has been encountered due to packing of the pellets at the bottoms of the pockets. With the present construction the pockets 52 to 58 have arcuate inner walls forming part of the drum 34 and these walls at the bottoms of the pockets are substantially spaced form the center of the valve. In this manner, packing of the pellets near the center of the rotor and the problem of dislodging such packed pellets is avoided.

Figure 5:
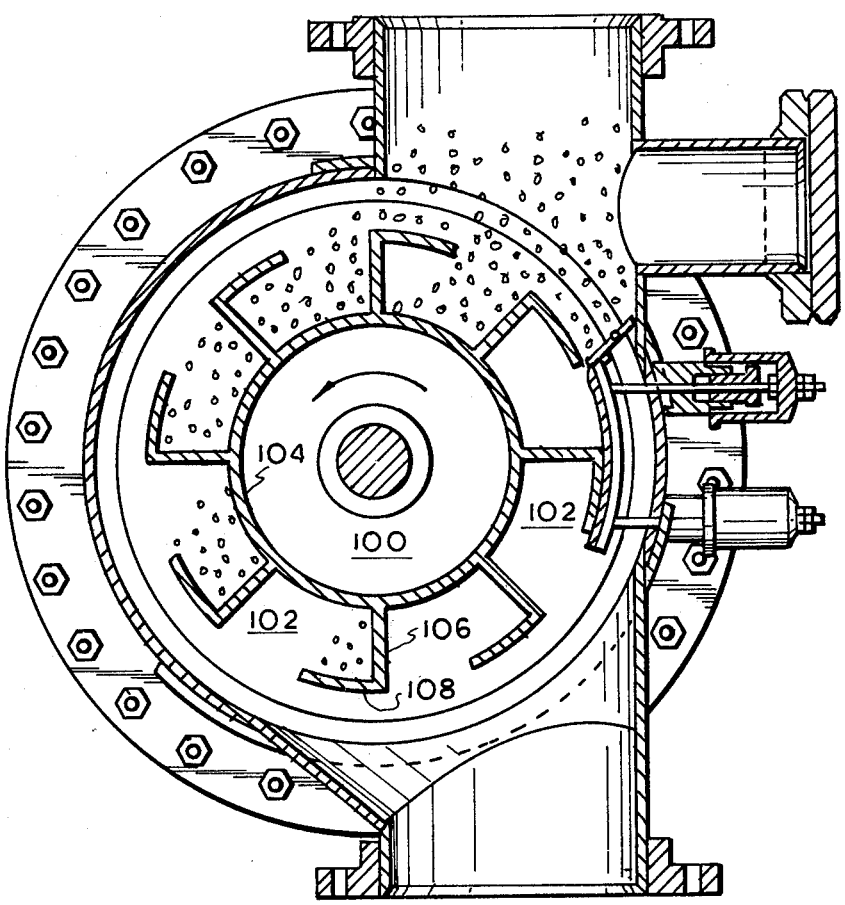
FIG. 5 is a vertical section similar to FIG. 2 but showing a modified form of rotor.

Turning now to FIG. 5 of the drawings, the modified rotor 100 there illustrated differs from the rotor 32 of FIG. 2 in that the closed pockets 44–50 and open pockets 52–58 of rotor 32 have been replaced by a ring of partially closed pockets 102. The pockets 102 are of like configuration and are defined by the central drum 104, radial walls 106 and arcuate lips 108 that extend circumferentially from the leading wall of each pocket in a direction opposite to the direction of rotation of the rotor. It has been found that the rotor construction of FIG. 5 provides a more nearly uniform flow of the particulate material than that of FIG. 2.

From the foregoing description it should be apparent that the present invention provides a rotary valve construction capable of achieving the several objects listed above. By providing an annulus of substantial volume between the outer circumference of the rotor and the inner circumference of the casing, pelletized or granular material of a friable character can be processed without producing excessive crushing and disintegration of the particulate material. Also the problem generated by the tendency of the pellets to become packed near the center of the rotor and to become difficult to dislodge has been overcome. Since the casing is completely sealed except for the rods 76 and 78, which are provided with packing glands, the structure is well adapted to be used at an elevated pressure. The bracket 74, wearplate 75 and baffle 92 provide an effective means for preventing uncontrolled flow of pellets at the upturning side of the rotor and the wearplate 75 can be readily replaced when required to provide a snug fit against the outer walls of the closed pockets.

It is of course to be understood that the foregoing description is intended to be illustrative only and that numerous changes can be made in the specific embodiment disclosed without departing from the spirit of the invention.

For example, in the embodiment of FIG. 2 the central angles subtended by the closed pockets and the open pockets need not be the same. Also the number, size and spacing of the pockets may be varied, and the radial width of the annulus 68 can be varied over a fairly wide range. Other modifications within the scope of the invention will be apparent to those skilled in the art.

What is claimed is:

1. A rotary valve adapted to be used in regulating the gravity flow of a friable granular material, said valve comprising, in combination, a casing having inlet and outlet conduits connected to the upper and lower portions thereof respectively and a generally cylindrical inner wall, a generally cylindrical rotor disposed within said casing mounted for rotation about a horizontal axis therein and substantially spaced from the inner wall of said casing to provide an annular space of sufficient width between said rotor and casing that particles of said friable material can pass without crumbling in said space from the inlet conduit to the outlet conduit, said rotor having a ring of at least partially open pockets defined by spaced radial walls having arcuate lips extending from the walls in a direction opposite to the direction of rotation of the rotor to render the pockets partially closed, said pockets being arranged to receive granular material fed to said inlet conduit and transmit it to said outlet conduit, and baffle means mounted in the annular space between said rotor and casing at the up-turning side of the rotor to prevent flow of granular material through said annular space counter-current to the direction of motion of said rotor, said baffle means having an inner surface close to and curved to conform with said arcuate lips, and said inner surface extending circumferentially a distance greater than the circumferential extent of the open portion of any of said partially open pockets.

2. A rotary valve according to claim 1, wherein said annular space of sufficient width is provided for substantially the entire down-turning side of said rotor to prevent crumbling of said friable particles that may become situated between said lips and the inner wall of said casing.

3. A rotary valve according to claim 1, wherein the bottoms of said pockets are arcuate and define a cylinder concentric with said rotor.

4. A rotary valve according to claim 1, wherein said baffle means comprises an arcuate wearplate, means for radially adjusting said arcuate wearplate, and a pivoted baffle plate extending between said casing and said wearplate to direct said granular material into pockets on the up-turning side of said rotor.

5. A rotary valve according to claim 1, wherein said annular space is larger than twice the mean particle diameter of said friable granular material.

6. A rotary valve adapted to be used in regulating the gravity flow of particles of a friable granular material comprising in combination a casing having inlet and outlet conduits connected to upper and lower portions thereof, respectively, a generally cylindrical interior wall, and axial end walls closing off ends of said casing; a generally cylindrical rotor within said casing and mounted for rotation about a horizontal axis therein and substantially spaced from the interior wall of said casing and from said end walls to provide an annular space between said rotor and said casing of sufficient width to permit said particles to pass, without being crumbled, from said inlet conduit to said outlet conduit and to provide sufficient end clearance between ends of the rotor and said end walls of the casing to permit said particles to pass therebetween without grinding to said outlet conduit; said rotor having a ring of at least partially open pockets therein constructed and arranged to receive said particles of said friable granular material fed into said inlet conduit and to transmit them to said outlet conduit, said pockets being defined by spaced radial walls and arcuate lips extending from the walls in a direction opposite to the direction of rotation of the rotor to render the pockets partially closed; and baffle means mounted in the annular space between said rotor and said casing at the up-turning side of the rotor to prevent flow of the granular material through said space counter-current to the direction of motion of said rotor, said baffle means having an inner surface close to and curved to conform with the arcuate lips of said rotor, such surface extending circumferentially over a distance greater than the circumferential extent of the open portion of any of said partially open pockets.

7. A rotary valve adapted to be used in regulating the gravity flow of particles of a friable granular material comprising, in combination, a casing having a generally cylindrical interior wall; a generally cylindrical rotor within said casing and mounted for rotation about a horizontal axis therein and substantially spaced from said casing interior wall sufficiently to provide an annular space therebetween to permit said particles to pass without grinding; an inlet conduit in an upper portion of said casing and offset from the horizontal axis of the rotor to permit vertical feeding of said particles to said rotor; an outlet conduit in a lower portion of said casing to receive the particles delivered thereto by said rotor, with said annular space providing clearance for said particles in the rotation direction of said rotor from said inlet conduit to said outlet conduit; said rotor having a ring of at least partially open pockets constructed and arranged to receive said particles of said friable granular material fed into said inlet conduit and to transmit them to said outlet conduit, said pockets being defined by spaced radial walls having arcuate lips extending from the walls in a direction opposite to the direction of rotation of the rotor to partially close said pockets; and baffle means mounted in the annular space between said rotor and said casing at the up-turning side of the rotor to prevent flow of the granular material through said space counter-current to the direction of motion of said rotor, said baffle means having an inner surface conforming to the arcuate lips, such surface extending circumferentially over a distance greater than the circumferential extent of the open portion of any of said partially open pockets.

8. A rotary valve according to claim 7, wherein said inlet conduit is offset towards the up-turning side of said rotor.

* * * * *